United States Patent
Kiyosawa

(10) Patent No.: US 12,359,710 B2
(45) Date of Patent: Jul. 15, 2025

(54) SPACE ROLLING BEARING AND SPACE STRAIN WAVE GEARING DEVICE

(71) Applicant: HARMONIC DRIVE SYSTEMS INC., Tokyo (JP)

(72) Inventor: Yoshihide Kiyosawa, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/560,780

(22) PCT Filed: Jul. 21, 2021

(86) PCT No.: PCT/JP2021/027398
§ 371 (c)(1),
(2) Date: Nov. 14, 2023

(87) PCT Pub. No.: WO2023/002630
PCT Pub. Date: Jan. 26, 2023

(65) Prior Publication Data
US 2024/0255045 A1    Aug. 1, 2024

(51) Int. Cl.
*F16H 49/00* (2006.01)
*F16C 33/66* (2006.01)
*F16H 57/04* (2010.01)

(52) U.S. Cl.
CPC ....... *F16H 49/001* (2013.01); *F16C 33/6696* (2013.01); *F16H 57/041* (2013.01);
(Continued)

(58) Field of Classification Search
CPC .... F16H 49/001; F16H 57/041; F16H 57/045; F16H 57/0471; F16H 57/048;
(Continued)

(56) References Cited

U.S. PATENT DOCUMENTS

| 2024/0255045 A1* | 8/2024 | Kiyosawa | ............. F16H 57/045 |
| 2024/0255050 A1* | 8/2024 | Kiyosawa | ................. F16N 9/02 |

FOREIGN PATENT DOCUMENTS

| JP | H07 88855 B2 | 9/1995 |
| JP | 2000074069 A | 3/2000 |

(Continued)

OTHER PUBLICATIONS

English Translation of jp 2006170317 (Year: 2006).*
(Continued)

*Primary Examiner* — Victor L MacArthur
(74) *Attorney, Agent, or Firm* — Buchanan Ingersoll & Rooney PC

(57) ABSTRACT

A wave bearing of a space strain wave gearing device comprises an inner ring formed from a bearing steel, an outer ring formed from a martensitic stainless steel, and balls formed from ceramics. On the inner ring formed from a bearing steel, a ceramic coating formed by an AD method is formed as a rust-preventive coating. In the space strain wave gearing device that adopts solid lubrication (powder lubrication), it is possible to reliably prevent rust from developing on the inner ring formed from a bearing steel of the wave bearing. In a space environment where the temperature greatly changes, appropriate setting of the linear expansion coefficients of the inner ring, the outer ring, and the balls enables a change in the radial gap of the wave bearing to be suppressed to a range that does not interfere with practical use.

7 Claims, 3 Drawing Sheets

(52) U.S. Cl.
CPC ....... *F16H 57/045* (2013.01); *F16H 57/0471* (2013.01); *F16H 57/048* (2013.01); *F16C 2361/61* (2013.01); *F16H 2049/003* (2013.01)

(58) Field of Classification Search
CPC .. F16H 2049/003; F16H 1/32; F16C 33/6696; F16C 2361/61; F16C 2202/04; F16C 2223/30; F16C 2223/60; F16C 33/32; F16C 33/62; F16C 33/64; F16C 33/34
See application file for complete search history.

(56) References Cited

FOREIGN PATENT DOCUMENTS

| | | |
|---|---|---|
| JP | 2000206722 A | 7/2000 |
| JP | 2000220641 A | 8/2000 |
| JP | 2006170317 A | 6/2006 |
| JP | 2008039037 A | 2/2008 |
| WO | 2017163976 A1 | 9/2017 |

OTHER PUBLICATIONS

English Translation of JP 2000220641 (Year: 2000).*
English Translation of JP 2008039037 (Year: 2008).*
English Translation of WO 2017163976 (Year: 2017).*
International Search Report (PCT/ISA/210) with translation and Written Opinion (PCT/ISA/237) mailed on Sep. 28, 2021 by the Japanese Patent Office as the International Searching Authority for International Application No. PCT/JP2021/027398. (9 pages).

* cited by examiner

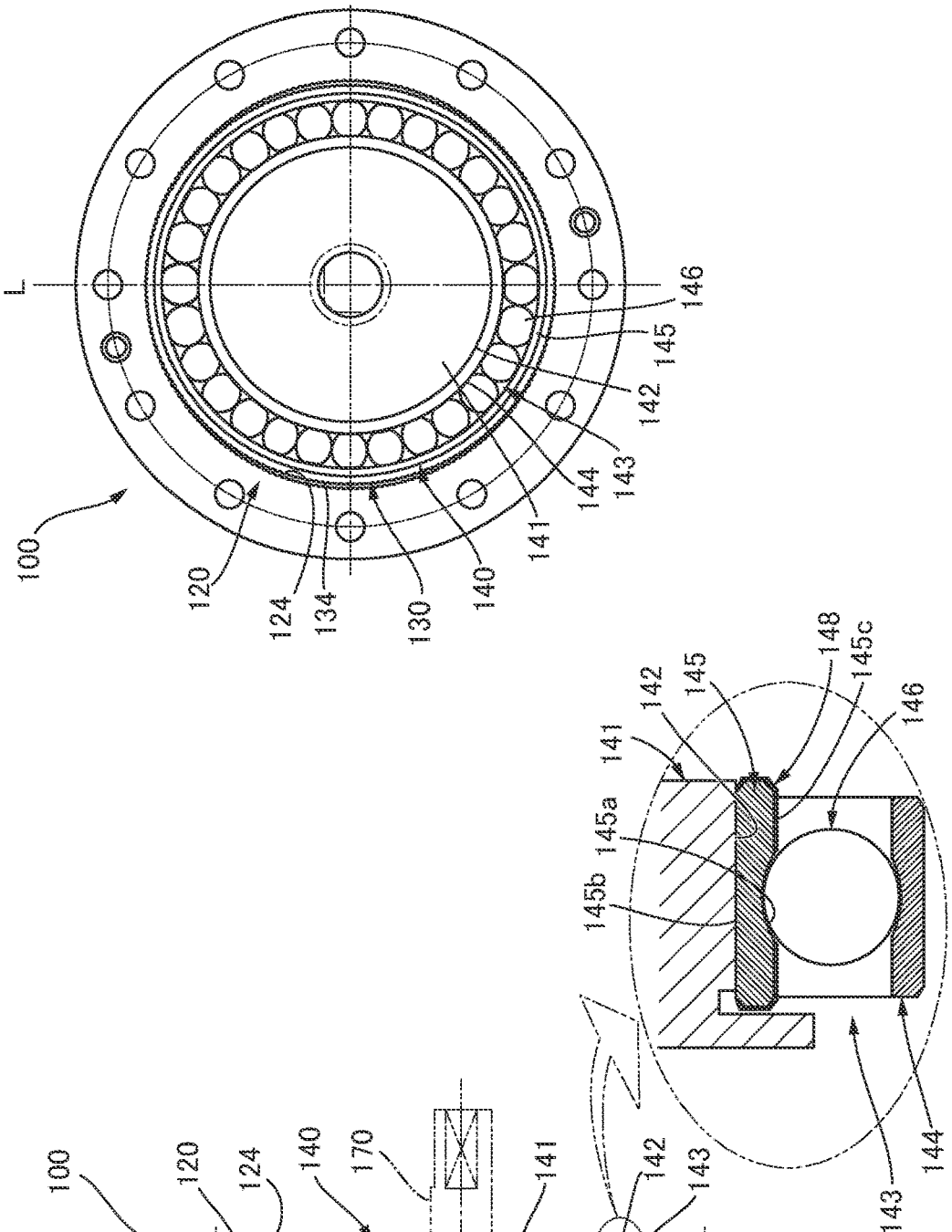

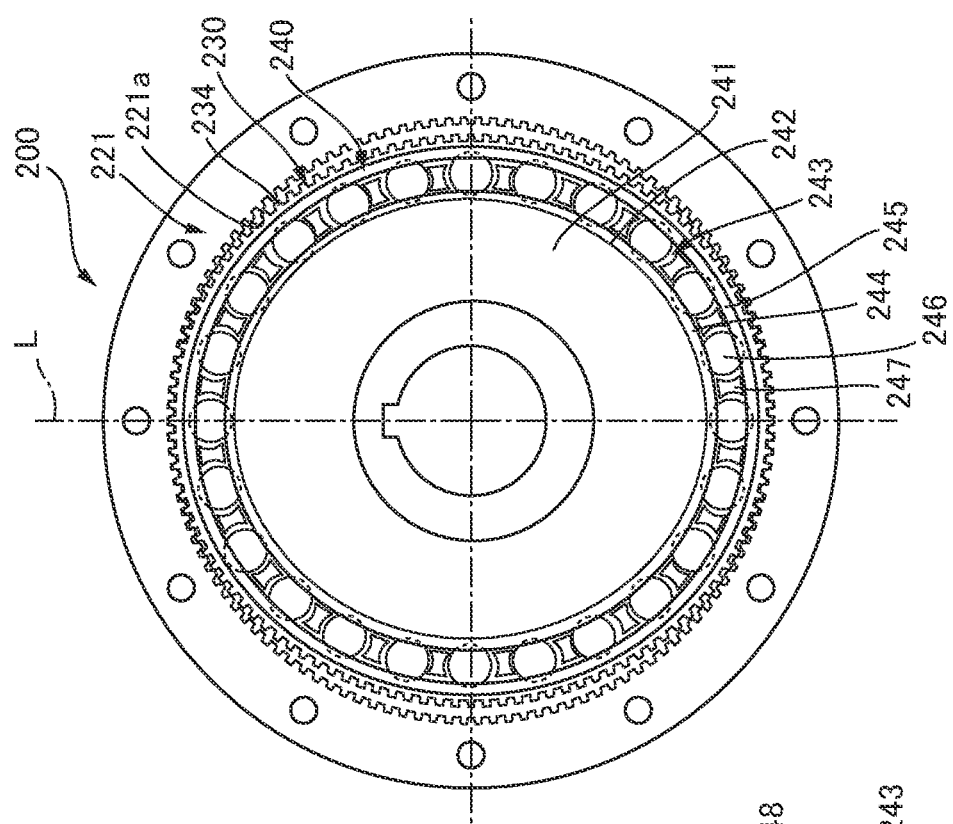
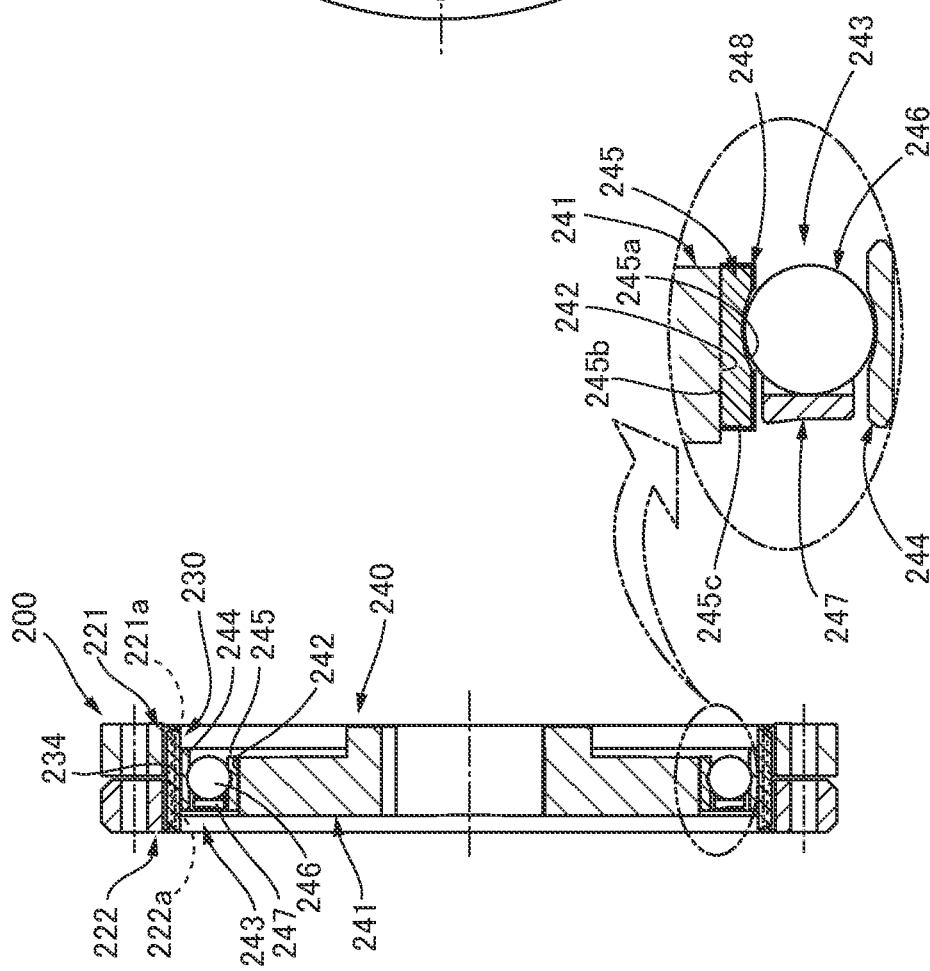

SPACE ROLLING BEARING AND SPACE STRAIN WAVE GEARING DEVICE

TECHNICAL FIELD

The present invention relates to a space rolling bearing used in outer space, where the environmental temperature is extremely low, ranging from about −70° C. to about −270° C., and the degree of vacuum is high or an ultravacuum at about $10^{-4}$ Pa or less.

BACKGROUND ART

Strain wave gearing devices are sometimes used as reduction gears in robot arm joints or other examples of mechanisms that are mounted on artificial satellites, spacecraft, etc., that navigate in outer space in a vacuum at extremely low temperatures. As is well known, a strain wave gearing device is constituted of three components: a rigid internally toothed gear, a flexible externally toothed gear, and a wave generator. The wave generator includes a rigid cam plate and a wave bearing attached to the outer peripheral surface of the cam plate.

Lubricants such as lubricating oil and grease cannot be used in wave bearings and other rolling bearings that are used in extremely low temperature and vacuum environments. A coating of solid lubricant is formed on parts to be lubricated or a solid lubricant powder is supplied to the parts to be lubricated, and the parts to be lubricated are thus lubricated. As rolling bearings used in extremely low temperature environments, Patent Documents 1 and 2 propose rolling bearings in which outer rings and inner rings are formed from a rolling martensitic stainless steel, a bearing steel, etc., and elements are formed from ceramics.

PRIOR ART LITERATURE

Patent Documents

[Patent Document 1] JP 2000-220641 A
[Patent Document 2] JP 2000-74069 A

DISCLOSURE OF THE INVENTION

Problems to be Solved by the Invention

In a rolling bearing that includes steel inner and outer rings and ceramic rolling elements, a gap inside the bearing decreases as the temperature decreases due to the difference in linear expansion coefficient between the steel and ceramic. In particular, in extremely low temperature environments of −70° C. or lower, the radial gap between the inner and outer rings decreases due to the difference in linear expansion coefficient between the steel and ceramic, causing problems such as impeding the proper rolling motion of the rolling elements.

In view of the foregoing, it is desirable to use a combination of ceramic rolling elements, a martensitic stainless steel outer ring, and a bearing steel inner ring as a space rolling bearing. When doing so, it is possible to suppress changes in the radial gap of the rolling bearing due to large temperature changes by utilizing the difference in linear expansion coefficient between these components.

However, bearing steel is susceptible to rust, and it is difficult to prevent bearing steel from rusting, especially when used in space rolling bearings where solid lubrication (powder lubrication) is performed in a vacuum. Moreover, when an inner ring made of a bearing steel is coated with a typical rust-preventive coating, a problem is encountered in that the bearing steel is annealed by the heat applied to the inner ring during coating, resulting in a decrease in strength and other properties.

An object of the present invention is to provide a space rolling bearing in which any fluctuation in the radial gap due to temperature changes can be suppressed and in which solid-lubricated or powder-lubricated raceway rings are appropriately rust-proofed, and to provide a space strain wave gearing device comprising a wave generator in which said space rolling bearing is used as a wave bearing.

Means Used to Solve the Above-Mentioned Problems

The space rolling bearing of the present invention is characterized by being:
provided with an inner ring, an outer ring, and a plurality of rolling elements disposed in a rollable state between the inner ring and the outer ring; lubricated by a solid lubricant coating or a solid lubricant powder; and used in a low-temperature vacuum environment,
the inner ring being formed from a bearing steel,
the outer ring being formed from a martensitic stainless steel,
the rolling elements being formed from ceramics,
a rust-preventive coating being formed on at least a portion of the surface of the inner ring, and
the rust-preventive coating being a ceramic coating formed by aerosol deposition (AD).

In AD, an aerosol containing ceramic fine particles, which are the raw material for the rust-preventive coating, dispersed in a gas is caused to collide at high speed with the surface of an inner ring base material made of a bearing steel to form a coating made of ceramic fine particles on the surface of the inner ring base material. Oxide ceramics such as alumina and zirconia, and carbide ceramics such as nitrides such as silicon nitride and silicon carbide are used as raw material ceramics. The formation of the rust-preventive coating via AD can be performed at room temperature.

It is desirable that the thickness of the rust-preventive coating is 1 to 5 μm. In addition, when a rust-preventive coating is formed on the rolling surfaces of the rolling elements formed on the outer peripheral surface of the inner ring, there is a possibility that the rust-preventive coating may peel off due to contact resistance caused by the rolling elements passing over the coating. Therefore, it is desirable to form a rust-preventive coating on the portion of the surface of the inner ring other than the rolling surfaces.

Furthermore, the bearing steel that is the material of the inner ring can be SUJ2, the martensitic stainless steel that is the material of the outer ring can be SUS440C, and the ceramic that is the material of the rolling elements can be $Si_3N_4$.

If the space rolling bearing of the present invention is used, it is possible to suppress the decrease in the radial gap between the inner and outer rings due to temperature changes in an extremely low-temperature environment of about −70° C. or below to within a range that does not interfere with practical use, and to maintain the proper rolling state of the ceramic rolling elements. Furthermore, a ceramic coating created via AD is formed as a rust-preventive coating on the inner ring made of a bearing steel, which is lubricated by solid lubrication (powder lubrication) at an extremely low temperature and under vacuum. According to AD, the bearing steel is not exposed to high temperatures during the formation of the coating; therefore, the heat generated during the formation of the rust-preventive coating does not cause any adverse effects such as a decrease in strength of the inner ring made of a bearing steel, and rust formation can be reliably prevented.

By using the space rolling bearing of the present invention as a wave bearing of a wave generator, a space strain wave gearing device suitable for use in an extremely low-temperature and vacuum environment can be obtained. Specifically, the space strain wave gearing device according to the present invention is characterized by comprising:

a rigid internally toothed gear;
a flexible externally toothed gear capable of meshing with the internally toothed gear; and
a wave generator configured to cause the externally toothed gear to flex in a radial direction and partially mesh with the internally toothed gear, and to cause meshing positions of the gears to move in the circumferential direction of the internally toothed gear,
the wave generator including a rigid cam plate and a wave bearing installed between the outer peripheral surface of the cam plate and the inner peripheral surface of the externally toothed gear, and
the wave bearing being a space rolling bearing configured as described above.

In the space strain wave gearing device, parts to be lubricated can be lubricated by a solid lubricant powder. In such instances, the space strain wave gearing device includes a lubrication mechanism that supplies a solid lubricant powder for lubricating the sliding portion between the externally toothed gear and the wave bearing, the wave bearing, and other parts to be lubricated.

A mechanism configured as follows can be used as the lubrication mechanism. Specifically, the lubrication mechanism includes a powder storage bag made of a flexible sheet material having a mesh structure, the solid lubricant powder is stored in the powder storage bag, the powder storage bag is attached to a part of the externally toothed gear that is repeatedly caused to flex by the wave generator, and the particle size of the solid lubricant powder and the size of the mesh are set so that the solid lubricant powder is released through the mesh of the powder storage bag.

Known examples of solid lubricants include soft metals such as silver (Ag) and lead (Pb), layered crystal structure materials such as molybdenum disulfide ($MoS_2$), tungsten disulfide ($WS_2$), and graphite, and three types of polymers such as polytetrafluoroethylene (PTFE) and polyimide (PI). For example, a layered crystal structure material can be used as the solid lubricant powder.

BRIEF DESCRIPTION OF THE DRAWINGS

FIG. 2A is a longitudinal cross-sectional view of a cup-profile space strain wave gearing device according to Embodiment 2 to which the present invention is applied;

FIG. 2B is an end surface view of the strain wave gearing device of FIG. 2A;

FIG. 3A is a longitudinal cross-sectional view of a flat-profile space strain wave gearing device according to Embodiment 3 to which the present invention is applied; and FIG. 3B is an end surface view of the strain wave gearing device of FIG. 3A.

MODE FOR CARRYING OUT THE INVENTION

Embodiments of the present invention are described below with reference to the drawings. The embodiments each relate to a space strain wave gearing device to which the present invention is applied, in which a space ball bearing is used as a wave bearing of a wave generator. A ball bearing is not provided by way of limitation on the space rolling bearing of the present invention; the present invention can also be applied to another rolling bearing such as a roller bearing or a cross roller bearing. In addition, the space rolling bearing of the present invention can also be applied to a bearing of a space drive mechanism other than a strain wave gearing device.

Embodiment 1

Figure 1B:
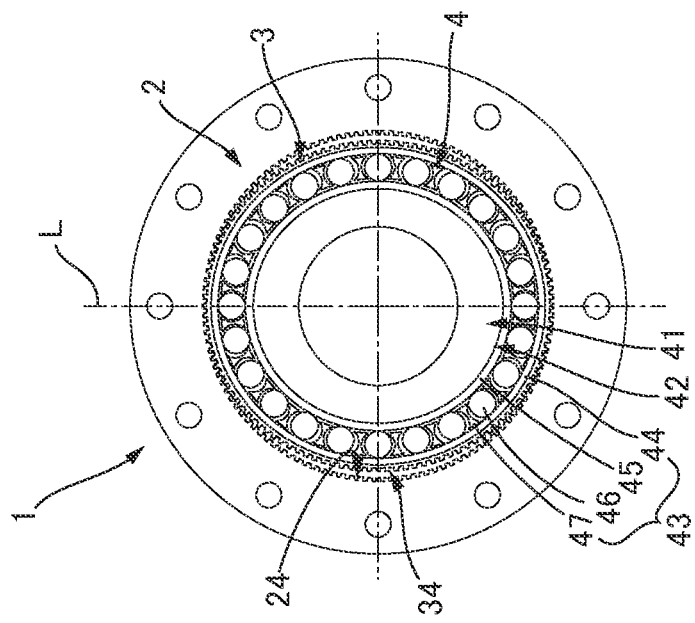
FIG. 1B is an explanatory drawing of a flexible externally toothed gear in mesh with a rigid internally toothed gear in the strain wave gearing device of FIG. 1A.
Figure 1A:
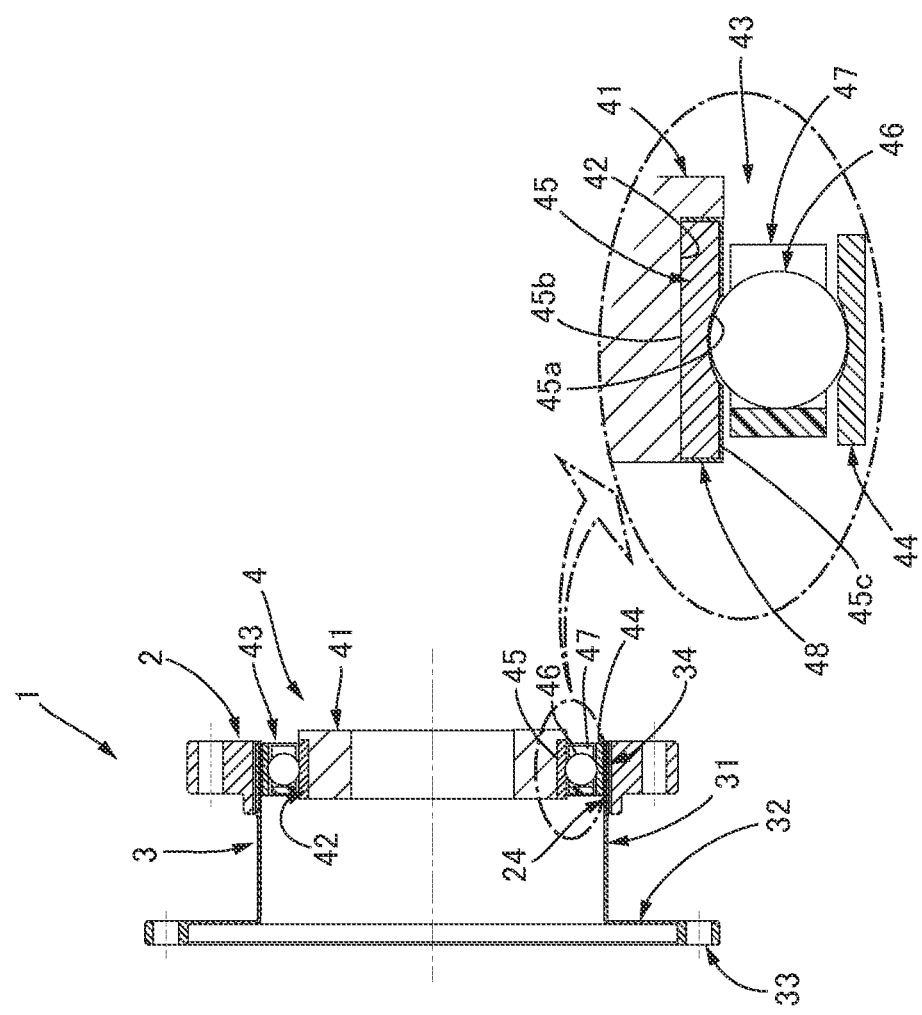
FIG. 1A is a longitudinal cross-sectional view of a top-hat-profile space strain wave gearing device according to Embodiment 1 to which the present invention is applied.

FIG. 1A is a longitudinal cross-sectional view of a space strain wave gearing device according to Embodiment 1 to which the present invention is applied, also displaying a partial enlarged view in which a part of the wave bearing is enlarged. FIG. 1B is an explanatory drawing of a state of mesh between a rigid internally toothed gear and a flexible externally toothed gear of the space strain wave gearing device. A space strain wave gearing device 1 (referred to below simply as "strain wave gearing device 1") is used in outer space where the temperature is extremely low at −70° C. to −270° C. and the degree of vacuum is $10^{-4}$ Pa or less.

The strain wave gearing device 1 includes an annular rigid internally toothed gear 2, a flexible externally toothed gear 3 having a top hat shape, and an ellipsoidally contoured wave generator 4. The externally toothed gear 3 includes a cylindrical barrel part 31 capable of flexing in a radial direction, a diaphragm 32 that widens outward in the radial direction from the rear end of the cylindrical barrel part 31, an annular rigid boss 33 integrally formed on the outer peripheral edge of the diaphragm 32, and external teeth 34 formed on the outer peripheral surface portion of the cylindrical barrel part 31 at the distal end side. The external teeth 34 are capable of meshing with internal teeth 24 of the internally toothed gear 2.

The wave generator 4 includes a rigid cam plate 41 and a wave bearing 43 mounted on an ellipsoidally contoured outer peripheral surface 42 of the cam plate 41. The wave bearing 43 includes an outer ring 44 and an inner ring 45 capable of flexing in the radial direction, a plurality of balls 46 mounted in a rollable state between the rings, and a ball retainer 47 that holds the balls 46 at regular intervals in a circumferential direction. The wave bearing 43 is a space ball bearing configured by applying the present invention. The outer ring 44 and inner ring 45 of the wave bearing 43 each have a perfect circular shape, but are mounted on the ellipsoidally contoured outer peripheral surface 42 of the cam plate 41 and are caused to flex into an ellipsoidal shape.

The externally toothed gear 3, which is caused to flex into an ellipsoidal shape by the wave generator 4, meshes with the internally toothed gear 2 at portions on both sides of a long axis L of the ellipsoidal shape, as shown in FIG. 1B. When the wave generator 4 is caused to rotate by a motor or the like (not shown), the meshing positions of the gears 2 and 3 move in the circumferential direction, and relative rotation occurs between the gears in accordance with the difference in the number of teeth between the gears. One gear is fixed, and reduced rotation is outputted from the other gear.

In the wave bearing 43, the material of the inner ring 45 is a bearing steel, e.g., SUJ2. The material of the outer ring 44 is a martensitic stainless steel, e.g., SUS440C. The material of the balls 46 is ceramic, e.g., $Si_3N_4$.

The following description refers to the partial enlarged view of FIG. 1A. A rust-preventive treatment is carried out on the surface of the inner ring 45. A rust-preventive coating is formed on the surface of the inner ring 45 as a rust-preventive treatment. The rust-preventive coating is a ceramic coating 48 formed by aerosol deposition (AD). The thickness of the ceramic coating 48 is about 1 μm to about 5 μm. On the circular outer peripheral surface of the inner ring 45, a curved surface portion extending in the circumferential direction serves as a rolling surface 45a. In this example, the ceramic coating 48 is formed so as to cover a surface portion 45c of the surface of the inner ring 45 excluding the rolling surface 45a and an inner peripheral surface 45b fastened to the outer peripheral surface 42 of the cam plate. The ceramic coating 48 may also be formed on the inner peripheral surface 45b of the inner ring 45; this also applies to Embodiments 2 and 3 below.

In the wave bearing 43 of this example, where ΔR is the amount of change, due to a change in environmental temperature, in the radial gap of the raceway portion between the inner ring 45 in a perfectly circular state and the outer ring 44 in a perfectly circular state, the amount of change ΔR can be defined by the following equation (1).

$$\Delta R = (D+d)(1-\alpha\Delta T) - (D-d)(1-\beta\Delta T) - 2d(1-\gamma\Delta T), \text{ where} \quad (1)$$

$d$: diameter (mm) of balls 46

$D$: pitch circle diameter $(PCD)$ (mm) of balls 46

$\alpha$: linear expansion coefficient $(1/°C.)$ of outer ring 44

$\beta$: linear expansion coefficient $(1/°C.)$ of outer ring 45

$\gamma$: linear expansion coefficient $(1/°C.)$ of outer ring 46

$\Delta T$: amount of change (°C.) in environmental temperature

Ideally, the radial gap should not change even if the environmental temperature changes. The condition under which the amount of change ΔR in the ideal state can be 0 is to define the linear expansion coefficients α, β, and γ of the outer ring 44, inner ring 45, and balls 46, respectively, so as to satisfy the following equation (2).

$$D/d(\beta - \alpha) - (\alpha + \beta - 2\gamma) = 0 \quad (2)$$

The inventors of the present invention have confirmed that given the pitch circle diameter D of the balls 46 and the diameter d of the balls 46 in the wave bearing 43, which is used in extremely low-temperature environments at −70° C. to −270° C., if the linear expansion coefficients α, β, and γ of the outer ring 44, inner ring 45, and balls 46 are set so as to satisfy the following conditional equation (3), the amount of change ΔR in the radial gap can be suppressed to a range that does not interfere with practical use.

$$-5 \times 10^{-6} < D/d(\beta - \alpha) - (\alpha + \beta - 2\gamma) < 10 \times 10^{-6} \quad (3)$$

In the wave bearing 43, for example, the pitch circle diameter (PCD) of the balls 46 is 80 mm, and the diameter d of the balls 46 is 8 mm. The bearing steel that is the material of the inner ring 45 is SUJ2, and the linear expansion coefficient β thereof is $12.5 \times 10^{-6}$. The martensitic stainless steel that is the material of the outer ring 44 is SUS440C, and the linear expansion coefficient α thereof is $10.2 \times 10^{-6}$. The ceramic that is the material of the balls 46 is $Si_3N_4$, and the linear expansion coefficient γ thereof is $2.6 \times 10^{-6}$.

Taking 260° C. to be the amount of change ΔT in environmental temperature, $$D = 80 \text{ mm}$$

$$d = 8 \text{ mm}$$

$$\alpha = 10.2 \times 10^{-6}$$

$$\beta = 12.5 \times 10^{-6}$$

$$\gamma = 2.6 \times 10^{-6}$$

therefore, $$D/d(\beta - \alpha) - (\alpha + \beta - 2\gamma) = 5.5 \times 10^{-6}$$

thus satisfying the above conditional equation (3).

Furthermore, the amount of change ΔR in radial gap determined from equation (1) is $$\Delta R = 0.011$$

which is within a range that does not interfere with practical use.

The strain wave gearing device 1 is provided with a lubrication mechanism (not shown). The parts to be lubricated of the strain wave gearing device 1 include the sliding portion of the wave bearing 43 and the sliding portion between the outer ring 44 of the wave bearing 43 and the inner peripheral surface of the externally toothed gear 3. These parts to be lubricated are lubricated by a solid lubricant powder supplied the from lubrication mechanism. Alternatively, a solid lubricant coating formed on the surfaces of the parts to be lubricated is used as the lubrication mechanism. In addition, a self-lubricating retainer made of a phenolic resin or the like is used for the ball retainer 47.

As described above, in the wave bearing 43 of the strain wave gearing device 1 of this example, the inner ring 45 is formed from a bearing steel, the outer ring 44 is formed from a martensitic stainless steel, and the balls 46 are formed from ceramics. It is thereby possible to suppress the amount of change ΔR in the radial gap of the wave bearing 43 to a range that does not interfere with practical use in a space environment that has extremely low temperatures of −70° C. to −270° C. and that is subject to temperature changes of about 260° C. To carry out a rust-preventive treatment on the inner ring 45, which is made of a bearing steel, a ceramic coating 48 is formed by AD. Rust prevention on the inner ring 45 of the wave bearing 43, which is lubricated with a solid lubricant coating or a solid lubricant powder, can thereby be reliably performed without causing problems such as a decrease in the strength of the inner ring 45.

In the example described above, the space rolling bearing of the present invention is applied to a wave bearing of a top-hat-profile strain wave gearing device. The present invention can be similarly applied to a wave bearing of a cup-profile strain wave gearing device or a flat-profile strain wave gearing device.

Embodiment 2

FIGS. 2A and 2B are a cross-sectional view and an end surface view of one example of a cup-profile space strain wave gearing device according to Embodiment 2 to which the present invention is applied. A cup-profile space strain wave gearing device 100 (referred to below simply as "strain wave gearing device 100") has a rigid internally toothed gear 120, a flexible externally toothed gear 130 that is disposed on the inner side of the internally toothed gear and that has a cup shape, and an ellipsoidally contoured wave generator 140 fitted to the inner side of the externally toothed gear. A cylindrical barrel part 131 of the externally toothed gear 130, in which external teeth 134 are formed, is caused to flex into an ellipsoidal shape by the wave generator 140. Both end portions of the long axis L of the ellipsoidal shape in the external teeth 134 mesh with internal teeth 124 of the annular internally toothed gear 120.

The wave generator 140 includes a rigid cam plate 141 fixed to the outer peripheral surface of a rotation input shaft 170, and a wave bearing 143 mounted on an ellipsoidal outer peripheral surface 142 of the rigid cam plate 141. The wave bearing 143 is a space (extremely-low-temperature environment) ball bearing configured by applying the present invention. The wave bearing 143 is fitted to the inner side of the externally toothed gear 130 in a state of having been caused to flex into an ellipsoidal shape by the rigid cam plate 141, and the wave bearing holds the externally toothed gear 130 and the rigid cam plate 141 in so as to allow relative rotation.

The wave bearing 143 is composed of, for example, a full-ball-shape deep-groove ball bearing. The wave bearing 143 includes a circular inner ring 145 capable of flexing in the radial direction, a circular outer ring 144 capable of flexing in the radial direction, and a plurality of balls 146 inserted in a rollable state into an annular ball raceway formed between the two rings. The balls 146 are inserted into ball raceway grooves such that adjacent balls 146 are in contact with each other or have a slight gap therebetween.

In the wave bearing 143 of this example as well, the inner ring 145 is formed from a bearing steel, the outer ring 144 is formed from a martensitic stainless steel, and the balls 146 are formed from ceramics. The values in conditional equation (3) described above are set so as to satisfy the equation, where d is the diameter of the balls 146, D is the pitch circle diameter, $\alpha$ is the linear expansion coefficient of the outer ring 144, $\beta$ is the linear expansion coefficient of the inner ring 145, and $\gamma$ is the linear expansion coefficient of the balls 146.

In the wave bearing 143, the material of the inner ring 145 is a bearing steel, e.g., SUJ2. The material of the outer ring 144 is a martensitic stainless steel, e.g., SUS440C. The material of the balls 146 is a ceramic, e.g., $Si_3N_4$.

A rust-preventive treatment is carried out on the surface of the inner ring 145. A rust-preventive coating is formed on the surface of the inner ring 145 as a rust-preventive treatment. The rust-preventive coating is a ceramic coating 148 formed by aerosol deposition (AD). The thickness of the ceramic coating 148 is about 1 μm to about 5 μm. As shown in the partial enlarged view of FIG. 2A, a rolling surface 145a extending in the circumferential direction is formed in the circular outer peripheral surface of the inner ring 145. In this example, the ceramic coating 148 is formed so as to cover a surface portion 145c of the surface of the inner ring 145 excluding the rolling surface 145a and an inner peripheral surface 145b mounted on the outer peripheral surface 142 of the rigid cam plate.

The strain wave gearing device 100 is provided with a lubrication mechanism 150. The parts to be lubricated of the strain wave gearing device 100 include the sliding portion of the wave bearing 143 and the sliding portion between the outer ring 144 of the wave bearing 143 and the inner peripheral surface of the cylindrical barrel part 131 of the externally toothed gear 130. These parts to be lubricated are lubricated by a solid lubricant powder 160 supplied from the lubrication mechanism 150.

The lubrication mechanism 150 of this example includes a powder storage bag 151 made of a flexible sheet material having a mesh structure. The solid lubricant powder 160 is stored in the powder storage bag 151. The powder storage bag 151 is attached to a part of the externally toothed gear 130 that is repeatedly caused to flex by the wave generator 140. The powder storage bag 151 of this example is an annular bag of a size corresponding to the inside end surface of a diaphragm 132 of the externally toothed gear 130, and is attached via an adhesive or the like to the inside end surface of the diaphragm 132. In addition, an annular fixing plate 152 made of perforated metal is fixed to a boss 133 of the externally toothed gear 130, and between the fixing plate 152 and the diaphragm 132, the powder storage bag 151 is held along the inner end surface of the diaphragm 132.

The size of the mesh of the powder storage bag 151 is greater than the particle size of the solid lubricant powder 160 so that the solid lubricant powder is released through the mesh. When the strain wave gearing device 100 is driven, the parts of the externally toothed gear 130 are repeatedly caused to flex by the wave generator 140. The diaphragm 132 portion is also repeatedly caused to flex as shown by an arrow in the drawing. The powder storage bag 151 disposed along the diaphragm 132 is also subjected to vibration and deformation, and the solid lubricant powder stored therein is released from the mesh into an inner space 135 of the externally toothed gear 130. The solid lubricant powder 160 released into the inner space 135 is supplied to the parts to be lubricated, and the parts to be lubricated are lubricated. The powder storage bag 151 can also be disposed at a part of the externally toothed gear 130 other than the diaphragm 132, e.g., along the inner peripheral surface of the cylindrical barrel part 131.

Embodiment 3

Next, FIGS. 3A and 3B are a cross-sectional view and an end surface view of a flat-profile space strain wave gearing device according to Embodiment 3 to which the present invention is applied. A flat-profile space strain wave gearing device 200 (referred to below simply as "strain wave gearing device 200") includes a stationary-side internally toothed gear 221 and a driving-side internally toothed gear 222 as rigid internally toothed gears. The internally toothed gears 221, 222 are coaxially disposed in parallel, and a cylindrical flexible externally toothed gear 230 is disposed on the inner sides of the internally toothed gears. An ellipsoidally contoured wave generator 240 is fitted inside the externally toothed gear 230. The externally toothed gear 230 is caused to flex into an ellipsoidal shape by the wave generator 240, and external teeth 234 mesh with both internal teeth 221a of the internally toothed gear 221 and internal teeth 222a of the internally toothed gear 222 at both end portions of the long axis L of the ellipsoidal shape. For example, the number of teeth of the stationary-side internally toothed gear 221 is 2n (n being a positive integer) greater than the number of teeth of the driving-side internally toothed gear 222, and the number of teeth of the externally toothed gear 230 is the same as the number of teeth of the driving-side internally toothed gear 222.

The wave generator 240 includes a rigid cam plate 241 and a wave bearing 243 mounted on an ellipsoidally contoured outer peripheral surface 242 of the cam plate 241. The wave bearing 243 includes an outer ring 244 and inner ring 245 capable of flexing in the radial direction, a plurality of balls 246 mounted in a rollable state between the rings, and a ball retainer 247 that holds the balls 246 at regular intervals in the circumferential direction. The wave bearing 243 is a space ball bearing configured by applying the present invention. The outer ring 244 and inner ring 245 of the wave bearing 243 have perfectly circular shapes, but are mounted on the ellipsoidally contoured outer peripheral surface 242 of the cam plate 241 and caused to flex into ellipsoidal shapes.

The externally toothed gear 230, caused to flex into an ellipsoidal shape by the wave generator 240, meshes with the internally toothed gears 221, 222 at portions on both sides of the long axis L of the ellipsoidal shape. When the wave generator 240 is caused to rotate by a motor or the like (not shown), the meshing positions of the stationary-side internally toothed gear 221 and the externally toothed gear 230 move in the circumferential direction, and the externally toothed gear 230 rotates at a reduced speed. Reduced rotation is outputted from the driving-side internally toothed gear 222, which rotates integrally with the externally toothed gear 230.

In the wave bearing 243 of this example as well, the inner ring 245 is formed from a bearing steel, the outer ring 244 is formed from a martensitic stainless steel, and the balls 246 are formed from ceramics. The values in conditional equation (3) described above are set so as to satisfy the equation, where d is the diameter of the balls 246, D is the pitch circle diameter, $\alpha$ is the linear expansion coefficient of the outer ring 244, $\beta$ is the linear expansion coefficient of the inner ring 245, and $\gamma$ is the linear expansion coefficient of the balls 246.

A rust-preventive treatment is carried out on the surface of the inner ring 245. A rust-preventive coating is formed on the surface of the inner ring 245 as a rust-preventive treatment. The rust-preventive coating is a ceramic coating 248 formed by aerosol deposition (AD), as shown in the partial enlarged view of FIG. 3A. The thickness of the ceramic coating 248 is about 1 μm to about 5 μm. A rolling surface 245a extending in the circumferential direction is formed in the circular outer peripheral surface of the inner ring 245. In this example, the ceramic coating 248 is formed so as to cover a surface portion 245c of the surface of the inner ring 245 excluding the rolling surface 245a and an inner peripheral surface 245b.

The strain wave gearing device 200 is provided with a lubrication mechanism (not shown). The parts to be lubricated of the strain wave gearing device 200 include the sliding portion of the wave bearing 243 and the sliding portion between the outer ring 244 of the wave bearing 243 and the inner peripheral surface of the externally toothed gear 230. These parts to be lubricated are lubricated by a solid lubricant powder supplied from the lubrication mechanism. Alternatively, a solid lubricant coating formed on the surfaces of the parts to be lubricated is used as the lubrication mechanism. In addition, a self-lubricating retainer made of, for example, a phenol resin or the like is used for the ball retainer 247.

The invention claimed is:

1. A space rolling bearing comprising:
   an inner ring, an outer ring, and a plurality of rolling elements disposed in a rollable state between the inner ring and the outer ring; lubricated by a solid lubricant coating or a solid lubricant powder; and configured to be used in a low-temperature vacuum environment,
   wherein
   the inner ring is formed from a bearing steel,
   the outer ring is formed from a martensitic stainless steel,
   the rolling elements are formed from ceramics,
   a surface of the inner ring has a first portion where the rolling elements roll and a second portion excluding the first portion where the rolling elements do not roll,
   a ceramic rust-preventive coating is formed on at least a part of the second portion and is not formed on the first portion which is free of any ceramic rust-preventive coating, and
   the ceramic rust-preventive coating is a ceramic coating formed by aerosol deposition.

2. The space rolling bearing according to claim 1, wherein a maximum thickness of the ceramic rust-preventive coating is 5 μm.

3. The space rolling bearing according to claim 1, wherein
   bearing steel that is a material of the inner ring is SUJ2,
   martensitic stainless steel that is a material of the outer ring is SUS440C, and
   ceramic that is a material of the rolling elements is $Si_3N_4$.

4. The space rolling bearing according to claim 1, wherein
   a maximum thickness of the rust-preventive coating is 5 μm,
   bearing steel that is a material of the inner ring is SUJ2,
   martensitic stainless steel that is a material of the outer ring is SUS440C, and
   ceramic that is a material of the rolling elements is $Si_3N_4$.

5. A space strain wave gearing device comprising:
   a rigid internally toothed gear;
   a flexible externally toothed gear capable of meshing with the internally toothed gear; and
   a wave generator configured to cause the externally toothed gear to flex in a radial direction and partially mesh with the internally toothed gear, and to cause meshing positions of the gears to move in a circumferential direction of the internally toothed gear,
   wherein
   the wave generator includes a rigid cam plate and a wave bearing installed between an outer peripheral surface of the cam plate and an inner peripheral surface of the externally toothed gear, and
   the wave bearing is the space rolling bearing according to claim 1.

6. The space rolling bearing according to claim 5, further comprising:
   a lubrication mechanism that supplies a solid lubricant powder for lubricating a sliding portion between the externally toothed gear and the wave bearing, and for lubricating the wave bearing.

7. The space rolling bearing according to claim 6, wherein the lubrication mechanism includes a powder storage bag made of a flexible sheet material having a mesh structure, and the solid lubricant powder is stored in the powder storage bag, the powder storage bag is attached to a part of the externally toothed gear that is repeatedly caused to flex by the wave generator, and a size of a mesh of the powder storage bag is set so that the solid lubricant powder is released through the mesh.

* * * * *